(12) United States Patent
Jiang et al.

(10) Patent No.: US 10,673,874 B2
(45) Date of Patent: *Jun. 2, 2020

(54) METHOD, APPARATUS, AND DEVICE FOR DETECTING E-MAIL ATTACK

(71) Applicant: Huawei Technologies Co., Ltd., Shenzhen (CN)

(72) Inventors: Wu Jiang, Beijing (CN); Xingshui Dong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/156,514

(22) Filed: Oct. 10, 2018

(65) Prior Publication Data

US 2019/0044962 A1 Feb. 7, 2019

Related U.S. Application Data

(63) Continuation of application No. 14/512,777, filed on Oct. 13, 2014, now Pat. No. 10,135,844, which is a (Continued)

(30) Foreign Application Priority Data

Dec. 27, 2012 (CN) .......................... 2012 1 0579285

(51) Int. Cl.
*H04L 29/06* (2006.01)
*H04L 12/58* (2006.01)

(52) U.S. Cl.
CPC .......... *H04L 63/1416* (2013.01); *H04L 51/12* (2013.01); *H04L 63/1408* (2013.01);
(Continued)

(58) Field of Classification Search
CPC . H04L 63/1416; H04L 51/12; H04L 63/1408; H04L 63/1441; H04L 63/1458; H04L 69/28; G06Q 10/107
See application file for complete search history.

(56) References Cited

U.S. PATENT DOCUMENTS 6,507,866 B1 * 1/2003 Barchi ................. G06Q 10/107
709/207
6,779,021 B1 8/2004 Bates et al.
(Continued)

FOREIGN PATENT DOCUMENTS

CN 101119321 A 2/2008
CN 101540773 A 9/2009
(Continued)

OTHER PUBLICATIONS

Machine Translation and Abstract of Chinese Publication No. CN101119321, Feb. 6, 2008, 15 pages.
(Continued)

*Primary Examiner* — Ali S Abyaneh
*Assistant Examiner* — Shu Chun Gao
(74) *Attorney, Agent, or Firm* — Conley Rose, P.C.

(57) ABSTRACT

A method, an apparatus, and a device for detecting an electronic mail (E-mail) attack. The device receives a data flow, obtains an E-mail traffic parameter of each statistic period within a predetermined number of statistic periods, where within each statistic period, the E-mail traffic parameter of each of the statistic periods is determined according to a protocol type of the received data flow, and determines that an E-mail attack is detected when the E-mail traffic parameter of each statistic period within the predetermined number of statistic periods matches a first threshold.

14 Claims, 7 Drawing Sheets

Related U.S. Application Data continuation of application No. PCT/CN2013/090383, filed on Dec. 25, 2013.

(52) U.S. Cl.
CPC ...... *H04L 63/1441* (2013.01); *H04L 63/1458* (2013.01); *H04L 69/28* (2013.01)

(56) References Cited

U.S. PATENT DOCUMENTS

| | | |
|---|---|---|
| 7,032,023 B1 | 4/2006 | Barrett et al. |
| 7,539,871 B1 | 5/2009 | Osborn |
| 7,548,956 B1 | 6/2009 | Aoki et al. |
| 7,716,297 B1 | 5/2010 | Wittel et al. |
| 7,752,665 B1* | 7/2010 | Robertson ............ H04L 63/1458 713/154 |
| 7,908,328 B1 | 3/2011 | Hulten et al. |
| 7,975,010 B1* | 7/2011 | Satish .................. G06Q 10/107 707/999.01 |
| 9,398,037 B1 | 7/2016 | Roskind et al. |
| 10,135,844 B2* | 11/2018 | Jiang ................... H04L 63/1441 |
| 2004/0252722 A1 | 12/2004 | Wybenga et al. |
| 2005/0198159 A1 | 9/2005 | Kirsch |
| 2006/0010215 A1 | 1/2006 | Clegg et al. |
| 2006/0031359 A1 | 2/2006 | Clegg et al. |
| 2006/0137009 A1 | 6/2006 | Chesla |
| 2006/0294588 A1* | 12/2006 | Lahann ............... H04L 63/1416 726/23 |
| 2007/0050777 A1 | 3/2007 | Hutchinson et al. |
| 2007/0271611 A1* | 11/2007 | Kwan .................. G06F 21/552 726/22 |
| 2008/0005316 A1 | 1/2008 | Feaver et al. |
| 2008/0034432 A1 | 2/2008 | Bohannon et al. |
| 2008/0082658 A1 | 4/2008 | Hsu et al. |
| 2008/0209564 A1* | 8/2008 | Gayde .................... G06F 21/50 726/25 |
| 2009/0037469 A1 | 2/2009 | Kirsch |
| 2009/0157708 A1 | 6/2009 | Bandini et al. |
| 2010/0218250 A1 | 8/2010 | Mori et al. |
| 2013/0325991 A1* | 12/2013 | Chambers ............... H04L 51/12 709/206 |
| 2014/0006522 A1* | 1/2014 | Syrowitz ................ H04L 51/12 709/206 |
| 2014/0245374 A1* | 8/2014 | Deerman ................ H04L 63/20 726/1 |

FOREIGN PATENT DOCUMENTS

| | | |
|---|---|---|
| CN | 101707539 A | 5/2010 |
| CN | 103078752 A | 5/2013 |

OTHER PUBLICATIONS

Machine Translation and Abstract of Chinese Publication No. CN101540773, Sep. 23, 2009, 18 pages.

Machine Translation and Abstract of Chinese Publication No. CN101707539, May 12, 2010, 16 pages.

Machine Translation and Abstract of Chinese Publication No. CN103078752, May 1, 2013, 21 pages.

Cheng, B., et al., "SIPS:A Stateful and Flow-Based Intrusion Prevention System for Email Applications," XP019070022, Network and Parallel Computing, Sep. 18, 2007, pp. 334-343.

Foreign Communication From a Counterpart Application, European Application No. 13866926.2, Extended European Search Report dated Feb. 11, 2015, 6 pages.

Foreign Communication From a Counterpart Application, Chinese Application No. 201210579285.X, Chinese Office Action dated Aug. 31, 2015, 12 pages.

Foreign Communication From a Counterpart Application, PCT Application No. PCT/CN2013/090383, English Translation of International Search Report dated Mar. 27, 2014, 3 pages.

Foreign Communication From a Counterpart Application, PCT Application No. PCT/CN2013/090383, English Translation of Written Opinion dated Mar. 27, 2014, 9 pages.

\* cited by examiner

METHOD, APPARATUS, AND DEVICE FOR DETECTING E-MAIL ATTACK

CROSS-REFERENCE TO RELATED APPLICATIONS

This application is a continuation of U.S. patent application Ser. No. 14/512,777, filed on Oct. 13, 2014, now U.S. Pat. No. 10,135,844 B2, which is a continuation of International Application No. PCT/CN2013/090383, filed on Dec. 25, 2013. The International Application claims priority to Chinese Patent Application No. 201210579285.X, filed on Dec. 27, 2012. All of the aforementioned applications are hereby incorporated by reference in their entireties.

TECHNICAL FIELD

The present disclosure relates to the field of communications technologies, and in particular, to a method, an apparatus, and a device for detecting an E-mail attack.

BACKGROUND

An E-mail attack, also called an "E-mail Bomb," is a means to attack an electronic mail (E-mail) mail box (E-mail box for short hereinafter) by continuously sending an E-mail spam to a target E-mail box within a short time so that a capacity of the target E-mail box reaches an upper limit, thereby leaving no extra space for accommodating a new E-mail. Moreover, when an E-mail attack occurs, transmission of an E-mail spam in a network consumes a great many network resources. This may lead to network congestion, causing many other E-mail boxes to fail to receive and send E-mails normally, and at the same time imposing a burden on an E-mail server.

When an E-mail attack occurs, exceptions usually appear in E-mail traffic received by the E-mail server. In general, an E-mail server receives an E-mail through a specific port (for example, a port 25), so when it is detected whether an E-mail attack occurs, statistics are usually collected on traffic for the specific port of the E-mail server, and when the E-mail traffic within a certain time exceeds a preset traffic threshold, it is deemed that an E-mail attack occurs and the traffic of the specific port of the E-mail server will be limited.

However, when this manner of detecting an E-mail attack is used, the specific port of the E-mail server also receives other data in addition to receiving E-mails. Therefore, when statistics are collected on the traffic of the specific port of the E-mail server, the traffic on which statistics are collected may include traffic of other data, for example, command data, in addition to the E-mail traffic. Consequently, a detection result of the E-mail attack is inaccurate, so it is impossible to correctly limit and handle the E-mail attack.

SUMMARY

Embodiments of the present disclosure provide a method, an apparatus and a device for detecting an E-mail attack to resolve a problem existing in the prior art that a detection result of an E-mail attack is inaccurate.

To resolve the forgoing problem, the embodiments of the present disclosure provide the following technical solutions.

According to a first aspect, a method for detecting an E-mail attack is provided and includes receiving a data flow, obtaining an E-mail traffic parameter of each statistic period within a predetermined number of statistic periods, where within each statistic period, determining the E-mail traffic parameter of each of the statistic periods according to a protocol type of the received data flow, and determining that an E-mail attack is detected when the E-mail traffic parameter of each statistic period within the predetermined number of statistic periods matches a first threshold.

With reference to the first aspect, in a first possible implementation manner of the first aspect, the determining the E-mail traffic parameter of each of the statistic periods according to a protocol type of the received data flow includes analyzing a protocol type of a data flow received in each of the statistic periods, determining that the data flow is an E-mail when the protocol type is an E-mail protocol type, and obtaining the E-mail traffic parameter of each of the statistic periods according to the determined E-mail.

With reference to the first aspect or the first possible implementation manner of the first aspect, in a second possible implementation manner of the first aspect, the E-mail traffic parameter includes the number of E-mails, or the number of newly created simple mail transfer protocol (SMTP) connections for transferring an E-mail, or the number of added SMTP concurrent connections for transferring an E-mail.

With reference to the first aspect, the first possible implementation manner of the first aspect, or the second possible implementation manner of the first aspect, in a third possible implementation manner of the first aspect, after the determining that an E-mail attack is detected, the method further includes obtaining recipient E-mail addresses of E-mails received in each detection period within a predetermined number of detection periods, collecting statistics on the number of occurrences of each obtained recipient E-mail address in each of the detection periods, and determining a recipient E-mail address, of which the number of occurrences in any detection period within the predetermined number of detection periods exceeds a second threshold, as a target address of the E-mail attack.

With reference to the third possible implementation manner of the first aspect, in a fourth possible implementation manner of the first aspect, the method further includes at the same time of the obtaining recipient E-mail addresses of E-mails received in each detection period within a predetermined number of detection periods, obtaining sender Internet Protocol (IP) addresses of the E-mails, establishing a correspondence between the recipient E-mail addresses and the sender IP addresses of the E-mails received in each of the detection periods, after the determining a recipient E-mail address, of which the number of occurrences in any detection period within the predetermined number of detection periods exceeds a second threshold, as a target address of the E-mail attack, the method further includes collecting statistics, according to the correspondence, on the number of occurrences of each sender IP address corresponding to the target address, and determining a sender IP address, of which the number of occurrences exceeds a third threshold, as an attacker IP address of the E-mail attack.

According to a second aspect, an apparatus for detecting an E-mail attack is provided and includes a receiving unit configured to receive a data flow, a first obtaining unit configured to obtain an E-mail traffic parameter of each statistic period within a predetermined number of statistic periods, where within each statistic period, determine the E-mail traffic parameter of each of the statistic periods according to a protocol type of the data flow received by the receiving unit, and a determining unit configured to determine, when the E-mail traffic parameter of each statistic period within the predetermined number of statistic periods matches a first threshold, that an E-mail attack is detected, where the E-mail traffic parameter is obtained by the first obtaining unit.

With reference to the second aspect, in a first possible implementation manner of the second aspect, the first obtaining unit includes a protocol type analyzing subunit configured to analyze, within each statistic period, a protocol type of a data flow received in each of the statistic periods, an E-mail determining subunit configured to determine that the data flow is an E-mail when the protocol type of the data flow, as analyzed by the protocol type analyzing subunit, is an E-mail protocol type, and a parameter obtaining subunit configured to obtain the E-mail traffic parameter of each of the statistic periods according to the E-mail determined by the E-mail determining subunit.

With reference to the second aspect or the first possible implementation manner of the second aspect, in a second possible implementation manner of the second aspect, the apparatus further includes a second obtaining unit configured to: after the determining unit determines that the E-mail attack is detected, obtain recipient E-mail addresses of E-mails received in each detection period within a predetermined number of detection periods, a first statistics collecting unit configured to collect statistics on the number of occurrences of each recipient E-mail address in each of the detection periods, where each recipient E-mail address is obtained by the second obtaining unit, and a target address determining unit configured to determine a recipient E-mail address, of which the number of occurrences in any detection period within the predetermined number of detection periods exceeds a second threshold, as a target address of the E-mail attack, where the number of occurrences is collected by the first statistics collecting unit.

With reference to the second possible implementation manner of the second aspect, in a third possible implementation manner of the second aspect, the apparatus further includes a third obtaining unit configured to: at the same time when the second obtaining unit obtains the recipient E-mail addresses of the E-mails received in each detection period within the predetermined number of detection periods, obtain sender IP addresses of the E-mails, a correspondence establishing unit configured to establish a correspondence, in each of the detection periods, between the recipient E-mail addresses obtained by the second obtaining unit and the sender IP addresses obtained by the third obtaining unit, a second statistics collecting unit configured to: after the target address determining unit determines the target address, collect statistics, according to the correspondence established by the correspondence establishing unit, on the number of occurrences of each sender IP address corresponding to the target address, and an attacker address determining unit configured to determine a sender IP address, of which the number of occurrences collected by the second statistics collecting unit exceeds a third threshold, as an attacker IP address of the E-mail attack.

According to a third aspect, a device for detecting an E-mail attack is provided and includes a network interface configured to receive a data flow, a processor configured to: obtain an E-mail traffic parameter of each statistic period within a predetermined number of statistic periods, where within each statistic period, the E-mail traffic parameter of each of the statistic periods is determined according to a protocol type of the data flow received by the network interface, and determine, when the E-mail traffic parameter of each statistic period within the predetermined number of statistic periods matches a first threshold, that an E-mail attack is detected.

With reference to the third aspect, in a first possible implementation manner of the third aspect, the processor is configured to: analyze, within each statistic period, a protocol type of a data flow received by the network interface within each of the statistic periods, determine that the data flow is an E-mail when the protocol type is an E-mail protocol type, and obtain the E-mail traffic parameter of each of the statistic periods according to the determined E-mail.

With reference to the third aspect or the first possible implementation manner of the third aspect, in a second possible implementation manner of the third aspect, the processor is further configured to: after determine that an E-mail attack is detected, obtain recipient E-mail addresses of E-mails received by the network interface in each detection period within a predetermined number of detection periods, collect statistics on the number of occurrences of each obtained recipient E-mail address in each of the detection periods, and determine a recipient E-mail address, of which the number of occurrences in any detection period within the predetermined number of detection periods exceeds a second threshold, as a target address of the E-mail attack.

With reference to the second possible implementation manner of the third aspect, in a third possible implementation manner of the third aspect, the processor is further configured to: at the same time of the obtaining recipient E-mail addresses of E-mails received by the network interface in each detection period within a predetermined number of detection periods, obtain sender IP addresses of the E-mails, establish the correspondence between the recipient E-mail addresses and the sender IP addresses of the E-mails received in each of the detection periods, after the determining a recipient E-mail address, of which the number of occurrences in any detection period within the predetermined number of detection periods exceeds a second threshold, as a target address of the E-mail attack, collect statistics, according to the correspondence, on the number of occurrences of each sender IP address corresponding to the target address, and determine a sender IP address, of which the number of occurrences exceeds a third threshold, as an attacker IP address of the E-mail attack.

In the method for detecting an E-mail attack according to the embodiment of the present disclosure, an E-mail traffic parameter is firstly determined, and then, according to the E-mail traffic parameter, it is determined that an E-mail attack is detected, where the E-mail traffic parameter is determined according to a protocol type of a received data flow. As can be seen from the above, when the received data flow includes other data traffic in addition to E-mail traffic, the E-mail traffic included in the received data flow can be determined according to the protocol type of the data flow. Therefore, the E-mail traffic parameter can be determined accurately such that a detection result of the E-mail attack is more accurate.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An attacker of an E-mail attack often uses some E-mail attacking software to launch the E-mail attack on a target E-mail box. When the target E-mail box is attacked, a great many E-mails or a large-sized E-mail is sent to the target E-mail box to use up space of the target E-mail box such that the target E-mail box cannot receive a new E-mail or be used normally. Some E-mail attacks even control a botnet to send a great many E-mails to a target E-mail box, occupying network resources and affecting other E-mail boxes in sending and receiving E-mails normally. In some cases, an E-mail used in an E-mail attack is most generated randomly or compiled randomly, and it is difficult to extract a character field from the E-mail, so it is unfeasible to detect an E-mail attack by means of existing character-field-based traffic detection. Additionally, because E-mail attacks may include a flood attack based on small traffic and traffic of some normal traffic data may also be very large within a short time. Therefore, it is also impossible to accurately detect an E-mail attack by detecting abnormal traffic. It has been found through in-depth analysis that, E-mail attacks have some common features, for example, a target E-mail box is fixed, that is, a recipient E-mail address is fixed, a protocol type of a data flow is an E-mail protocol type, for example, the SMTP type, and a real communication connection is adopted on the basis of the Transmission Control Protocol (TCP), and when an E-mail attack occurs, a same E-mail server receives a relatively large number of E-mails within a certain time period. Furthermore, spam E-mails sent during an E-mail attack also have some common features. For example, a recipient E-mail address and a sender E-mail address of an E-mail are the same, or text content of the E-mails are similar. It can be understood that, a person skilled in the art may derive more features from the forgoing features, which are not described one by one herein.

For these common features of E-mail attacks, the present disclosure provides a technical solution capable of accurately identifying an E-mail attack, which can detect the E-mail attack so that the target E-mail box to be attacked will not be attacked and can be used normally without affecting normal use of one or more other E-mail boxes in a network.

Figure 1:
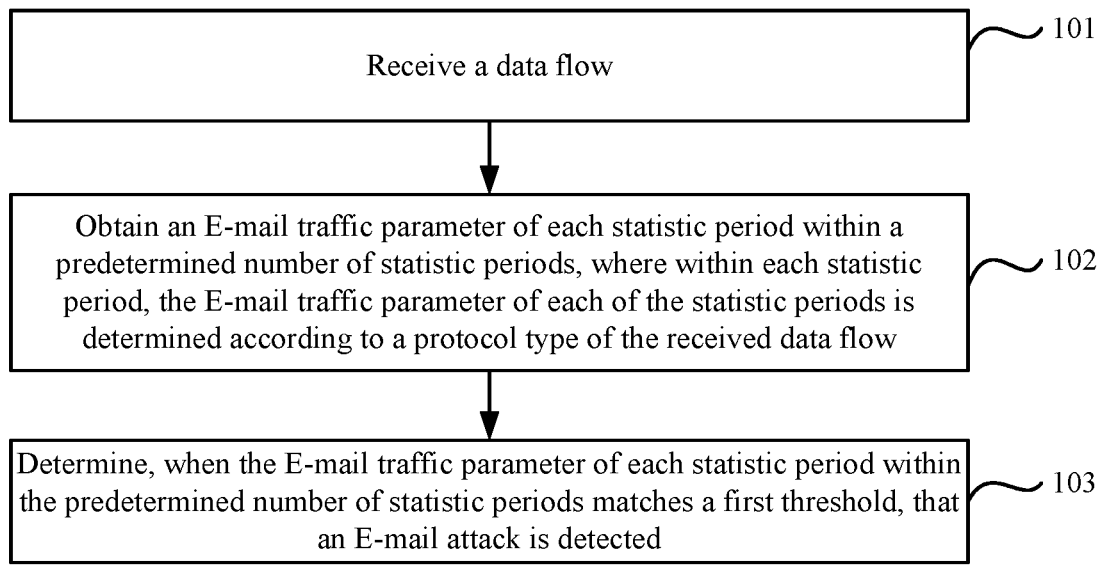
FIG. 1 is a schematic flowchart diagram of a method for detecting an E-mail attack according to an embodiment of the present disclosure.

FIG. 1 shows a method for detecting an E-mail attack according to an embodiment of the present disclosure, and a specific processing process of the method is as follows.

Step 101: Receive a data flow.

Step 102: Obtain an E-mail traffic parameter of each statistic period within a predetermined number of statistic periods, where within each statistic period, the E-mail traffic parameter of each of the statistic periods is determined according to a protocol type of the received data flow.

An execution entity of this embodiment may be an E-mail server or a gateway device in an existing network.

In the embodiment of the present disclosure, the determining the E-mail traffic parameter of each statistic period according to a protocol type of the received data flow may include analyzing a protocol type of a data flow received in each of the statistic periods, determining that the data flow is an E-mail when the protocol type is an E-mail protocol type, and obtaining the E-mail traffic parameter of each statistic period according to the determined E-mail.

The E-mail protocol type may be an SMTP protocol, a Post Office Protocol (such as Post Office Protocol 3, or POP3), or the Internet Message Access Protocol (IMAP), and the SMTP Protocol is used as an example for description in this embodiment of the present disclosure.

The E-mail traffic parameter may include the number of E-mails, the number of newly created SMTP connections for transferring an E-mail, or the number of added SMTP concurrent connections for transferring an E-mail.

Step 103: Determine, when the E-mail traffic parameter of each statistic period within the predetermined number of statistic periods matches a first threshold, that an E-mail attack is detected.

After it is determined that an E-mail attack is detected, corresponding preventive measures may be taken. Further, the following three preventive measures may be taken. First, after it is determined that an E-mail attack is detected, traffic is limited for the E-mail server to prevent network congestion caused by the E-mail attack. Second, after it is determined that an E-mail attack is detected, a target address of the E-mail attack is further determined, that is, the E-mail box address to be attacked by the E-mail attack is determined such that traffic can be limited for the determined target address. Third, after it is determined that an E-mail attack is detected, firstly the target address of the E-mail attack is further determined, and then an attacker IP address of the E-mail attack is determined such that traffic can be limited for the determined attacker IP address. For example, the attacker IP address is prevented from sending an E-mail.

When the first preventive measure is taken, the first preventive measure may be performed immediately after it is determined that an E-mail attack is detected.

When the second preventive measure is taken, after it is determined that an E-mail attack is detected, the target address of the E-mail attack has to be determined. Accordingly, the embodiment of the present disclosure may further include a processing procedure of determining the target address, which involves firstly obtaining recipient E-mail addresses of E-mails received in each detection period within a predetermined number of detection periods, then collecting statistics on the number of occurrences of each obtained recipient E-mail address in each detection period, and determining a recipient E-mail address, of which the number of occurrences in any detection period within the predetermined number of detection periods exceeds a second threshold, as the target address of the E-mail attack.

When the third preventive measure is taken, after it is determined that an E-mail attack is detected, not only the target address of the E-mail attack needs to be determined, but also the attacker IP address of the E-mail attack needs be determined. Accordingly, in addition to the processing procedure of determining the target address (this processing procedure is similar to the processing procedure when the second preventive measure is taken, so it is not described herein again), the embodiment of the present disclosure may further include a processing procedure of determining the attacker IP address. This processing procedure may include, at the same time of the obtaining recipient E-mail addresses of E-mails received in each detection period within a predetermined number of detection periods, obtaining sender IP addresses of the E-mails, establishing a correspondence between the recipient E-mail addresses and the sender IP addresses of the E-mails received in each of the detection periods, and after the target address of the E-mail attack is determined, collecting statistics, according to the correspondence, on the number of occurrences of each sender IP address corresponding to the target address, and determining a sender IP address, of which the number of occurrences exceeds a third threshold, as the attacker IP address of the E-mail attack.

In the embodiment of the present disclosure, the first threshold may be preset to a fixed value before the E-mail attack is detected, and further, when the E-mail traffic parameter mismatches the first threshold during the process of detecting the E-mail attack, the first threshold may be adjusted according to the E-mail traffic parameter such that subsequently the E-mail attack can be detected according to the adjusted first threshold.

As can be seen from the above, in the method for detecting an E-mail attack according to the embodiment of the present disclosure, an E-mail traffic parameter needs to be firstly determined, and then, according to the determined E-mail traffic parameter, it is determined that an E-mail attack is detected. The E-mail traffic parameter needs to be determined according to a protocol type of a received data flow. When the received data flow includes other data traffic in addition to E-mail traffic, the E-mail traffic included in the received data flow can be determined according to the protocol type of the data flow. Therefore, the E-mail traffic parameter can be determined accurately, and correspondingly, a detection result of the E-mail attack is more accurate.

Figure 2:
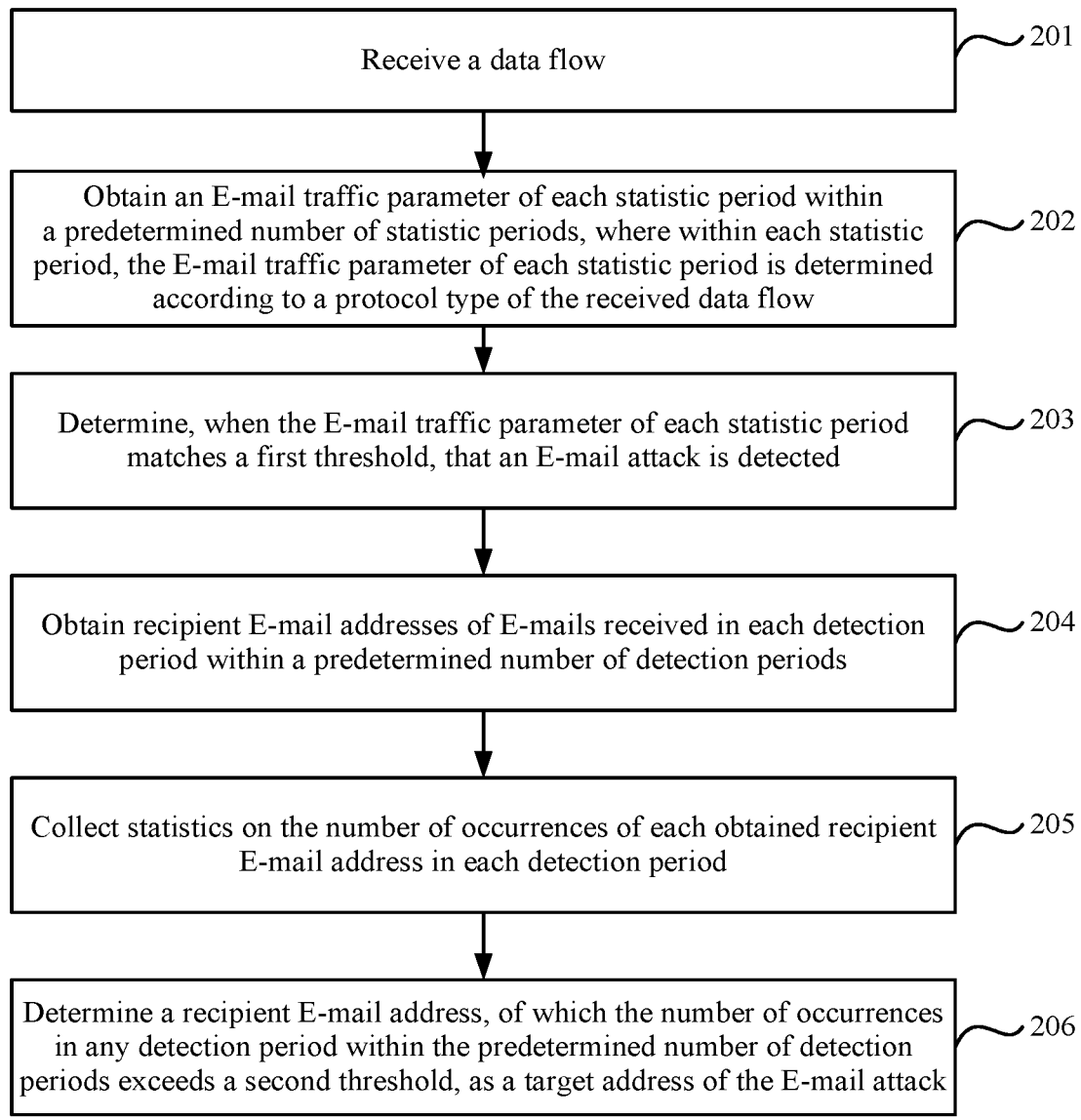
FIG. 2 is a schematic flowchart diagram of a method for detecting an E-mail attack according to another embodiment of the present disclosure.

FIG. 2 shows a method for detecting an E-mail attack according to another embodiment of the present disclosure. In this embodiment, after an E-mail attack is detected, a target address of the E-mail attack needs to be further determined, and a specific processing process of the method is as follows:

Step 201: Receive a data flow.

Step 202: Obtain an E-mail traffic parameter of each statistic period within a predetermined number of statistic periods, where within each statistic period, the E-mail traffic parameter of each statistic period is determined according to a protocol type of the received data flow.

An execution entity of this embodiment may be an E-mail server or a gateway device in an existing network.

In the embodiment of the present disclosure, the determining the E-mail traffic parameter of each statistic period according to a protocol type of the received data flow may use the following method: analyzing a protocol type of a data flow received in each statistic period, determining that the data flow is an E-mail when the protocol type is an E-mail protocol type, and obtaining the E-mail traffic parameter of each statistic period according to the determined E-mail.

The E-mail traffic parameter may include the number of E-mails, the number of newly created SMTP connections for transferring an E-mail, or the number of added SMTP concurrent connections for transferring an E-mail.

Step 203: Determine, when the E-mail traffic parameter of each statistic period matches a first threshold, that an E-mail attack is detected.

Because a value of the E-mail traffic parameter changes stably in normal cases and experiences an obvious sudden change when an E-mail attack occurs, a reference value may be preset for the E-mail traffic parameter, where the reference value is the first threshold.

In the embodiment of the present disclosure, the first threshold may be preset to a fixed value before the E-mail attack is detected, and further, when the E-mail traffic parameter mismatches the first threshold during the process of detecting the E-mail attack, the first threshold may be adjusted according to the E-mail traffic parameter such that subsequently the E-mail attack can be detected according to the adjusted first threshold. That the E-mail traffic parameter mismatches the first threshold may include that the E-mail traffic parameter does not exceed the first threshold. For example, when the E-mail traffic parameter is the number of E-mails, and the first threshold is 100, if the determined number of E-mails is 10, the number of E-mails does not exceed the first threshold, indicating that the E-mail traffic parameter mismatches the first threshold, and if the determined number of E-mails is 200, the number of E-mails exceeds the first threshold, indicating that the E-mail traffic parameter matches the first threshold.

A method of determining the first threshold may include the following processing procedure, which involves before the E-mail attack is detected, an initial value of the first threshold is determined through a process of traffic learning, traffic modeling, and model outputting, where the initial value of the first threshold is a fixed value. Generally, this process is called a learning stage prior to detection of the E-mail attack, and only after the learning stage is completed, can the E-mail attack be detected, that is, entering a working state. During detection of the E-mail attack, an E-mail traffic parameter of a statistic period is determined according to a protocol type of the received data flow within the statistic period. When the determined E-mail traffic parameter mismatches the first threshold, the first threshold is adjusted according to the E-mail traffic parameter, where an initial value of the first threshold may be determined based on the forgoing learning stage, and the first threshold may be adjusted according to the E-mail traffic parameter.

Step 204: Obtain recipient E-mail addresses of E-mails received in each detection period within a predetermined number of detection periods.

In this embodiment of the present disclosure, content of the E-mails may be analyzed after the E-mails are received to obtain the recipient E-mail addresses of the E-mails.

Step 205: Collect statistics on the number of occurrences of each obtained recipient E-mail address in each detection period.

In the embodiment of the present disclosure, after a recipient E-mail address of the E-mail is obtained, the recipient E-mail address may be standardized and converted into a same case mode, and then the recipient E-mail address is searched for from recipient E-mail addresses that are already stored. If the recipient E-mail address is not found, the recipient E-mail address is stored and the number of occurrences of the recipient E-mail address is initialized to be one, and if the recipient E-mail address is found, the number of occurrences of the recipient E-mail address is increased by 1.

Step 206: Determine a recipient E-mail address, of which the number of occurrences in any detection period within the predetermined number of detection periods exceeds a second threshold, as a target address of the E-mail attack.

When the target address is not detected in any detection period within the predetermined number of detection periods, it is determined that no E-mail attack occurs.

As can be seen from the above, in the method for detecting an E-mail attack according to this embodiment of the present disclosure, not only a detection result is more accurate, but also, after it is determined that an E-mail attack is detected, a target address of the E-mail attack is further determined such that a preventive measure such as traffic limiting can be taken for the determined target address.

Figure 3:
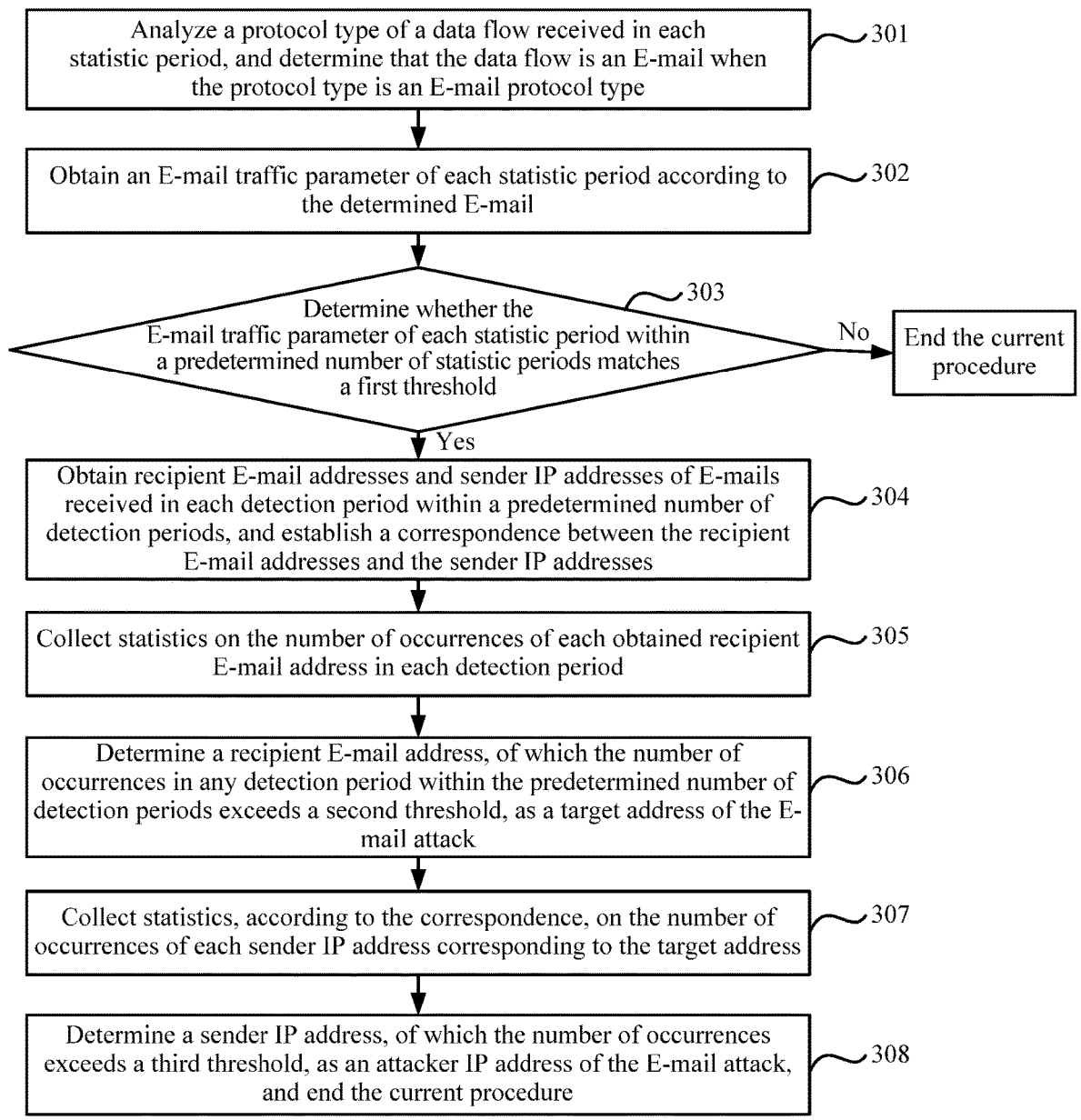
FIG. 3 is a schematic flowchart diagram of a method for detecting an E-mail attack according to still another embodiment of the present disclosure.

FIG. 3 shows a method for detecting an E-mail attack according to still another embodiment of the present disclosure. In this embodiment, after it is determined that an E-mail attack is detected, a target address of the E-mail attack is firstly further determined and then an attacker IP address of the E-mail attack is determined, a specific processing process of the method is as follows.

Step 301: Analyze a protocol type of a data flow received in each statistic period, and determine that the data flow is an E-mail when the protocol type is an E-mail protocol type.

An execution entity of this embodiment may be an E-mail server or a gateway device in an existing network.

Step 302: Obtain an E-mail traffic parameter of each statistic period according to the determined E-mail.

Step 303: Determine whether the E-mail traffic parameter of each statistic period within a predetermined number of statistic periods matches a first threshold, and, if a determination result is yes, perform step 304, if the determination result is no, end the current procedure.

Step 304: Obtain recipient E-mail addresses and sender IP addresses of E-mails received in each detection period within a predetermined number of detection periods, and establish a correspondence between the recipient E-mail addresses and the sender IP addresses.

The correspondence is a correspondence between the recipient E-mail addresses and the sender IP addresses of the E-mails received in each detection period.

In this embodiment, a monitoring entry may be created in each detection period, where the monitoring entry is used to store the correspondence between the recipient E-mail addresses and the sender IP addresses of the E-mails received in the detection period. In each detection period, the recipient E-mail addresses and the sender IP addresses of the E-mails may be firstly obtained after the E-mails are received.

For each obtained recipient E-mail address, a Hash node corresponding to the recipient E-mail address may be searched for in the created monitoring entry. If a search result is that the Hash node corresponding to the recipient E-mail address does not exist, the Hash node corresponding to the recipient E-mail address is created. In a Hash node corresponding to each recipient E-mail address, the recipient E-mail address and the number of occurrences of the recipient E-mail address in a detection period may be stored, and in addition, a sender IP address and the number of occurrences of the sender IP address in a detection period are saved in a slave node of the Hash node.

Step 305: Collect statistics on the number of occurrences of each obtained recipient E-mail address in each detection period.

In this embodiment, an initial value of the number of occurrences of each recipient E-mail address within each detection period is one. If a result of searching for the monitoring entry is that the Hash node corresponding to the recipient E-mail address exists, the number of occurrences of the recipient E-mail address in a detection period, which is stored in the found Hash node, is increased by 1. When one detection period ends, statistics are collected on the number of occurrences of each recipient E-mail address in each detection period according to the created monitoring entry.

Step 306: Determine a recipient E-mail address, of which the number of occurrences in any detection period within the predetermined number of detection periods exceeds a second threshold, as a target address of the E-mail attack.

Step 307: Collect statistics, according to the correspondence, on the number of occurrences of each sender IP address corresponding to the target address.

In this embodiment, after the target address of the E-mail attack is determined, all slave nodes of the Hash node corresponding to the target address can be traversed to collect statistics on the number of occurrences of each sender IP address corresponding to the target address.

Step 308: Determine a sender IP address, of which the number of occurrences exceeds a third threshold, as an attacker IP address of the E-mail attack, and end the current procedure.

As can be seen from the above, in the method for detecting an E-mail attack according to this embodiment of the present disclosure, not only a detection result is more accurate, but also, after it is determined that an E-mail attack is detected, a target address of the E-mail attack is further determined and then an attacker IP address of the E-mail attack is determined such that traffic can be limited for the attacker IP address. For example, the attacker IP address is prevented from sending an E-mail. Therefore, prevention against the E-mail attack is more targeted and also more effective.

Figure 4:
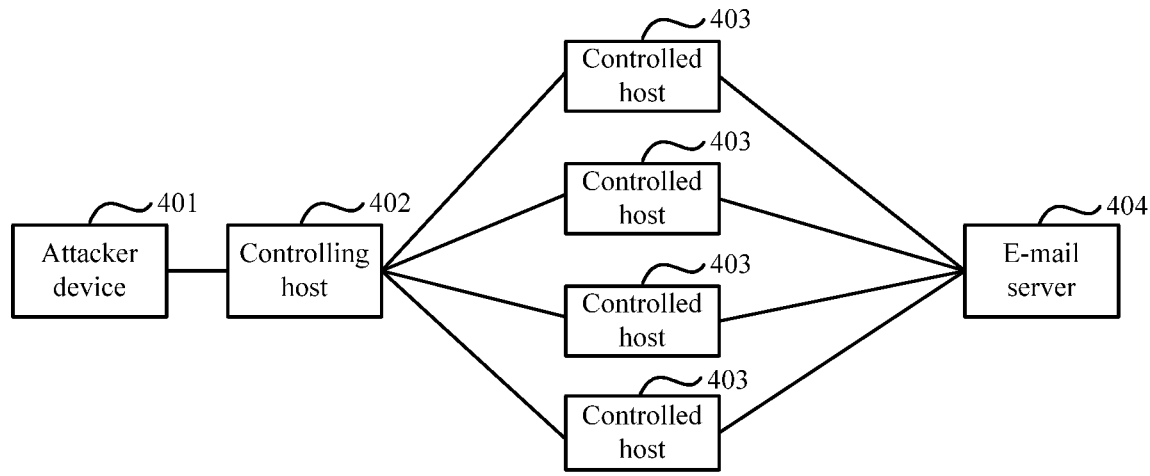
FIG. 4 is a schematic diagram of a network architecture according to an embodiment of the present disclosure.

FIG. 4 shows a schematic diagram of a network architecture of a method for detecting an E-mail attack according to the present disclosure, where an E-mail server 404 is responsible for management of sending and receiving of E-mails, and an attacker device 401 initiates an E-mail attack using one controlling host 402 and a plurality of controlled hosts 403. Because a plurality of controlled hosts serving as attacking hosts exist, an E-mail attack shown in FIG. 4 is a Distributed Denial of Service (DDoS) attack. It should be noted that, a DDoS attack manner shown in FIG. 4 is only an example, and for another type of E-mail attacks, the embodiments of the present disclosure may also be used for detection, which is not limited in the embodiments of the present disclosure.

On the basis of the network architecture shown in FIG. 4, another embodiment of the present disclosure may adopt the following processing method, which involves firstly obtaining the number of E-mails in each statistic period within a predetermined number of statistic periods, where within a statistic period, the number of E-mails in the statistic period is determined according to a protocol type of a received data flow, determining that an E-mail attack is detected when the number of E-mails in each statistic period matches a first threshold, and then entering a detection mode to create one monitoring entry in each detection period, where the monitoring entry is used to store a correspondence between recipient E-mail addresses and sender IP addresses of E-mails received in the detection period. In a detection period, recipient E-mail addresses and sender IP addresses of E-mails are first obtained after the E-mails are received. For each obtained recipient E-mail address, whether a Hash node corresponding to the recipient E-mail address exists is searched for in the created monitoring entry. If a search result is that the Hash node corresponding to the recipient E-mail address does not exist, the Hash node corresponding to the recipient E-mail address is created. The recipient E-mail address and the number of occurrences of the recipient E-mail address in the detection period is stored in the Hash node, with an initial value of the number of occurrences being 1, and if a search result is that the Hash node corresponding to the recipient E-mail address exists, the number of occurrences of the recipient E-mail address in the detection period, which is stored in the found Hash node, is increased by one. In addition, a sender IP address and the number of occurrences of the sender IP address in the detection period are saved in slave nodes of the Hash node, and data of the entry is refreshed in the detection period. When a detection period ends, the number of occurrences of each recipient E-mail address in the detection period is obtained according to the created monitoring entry, and a recipient E-mail address, of which the number of occurrences in the detection period exceeds a second threshold, is determined as a target address of the E-mail attack. Then, all slave nodes of the Hash node corresponding to the target address are traversed, and a sender IP address, of which the number of occurrences (that is, the number of E-mails sent to the target address) exceeds a third threshold, is determined as an attacker IP address of the E-mail attack.

Figure 5:
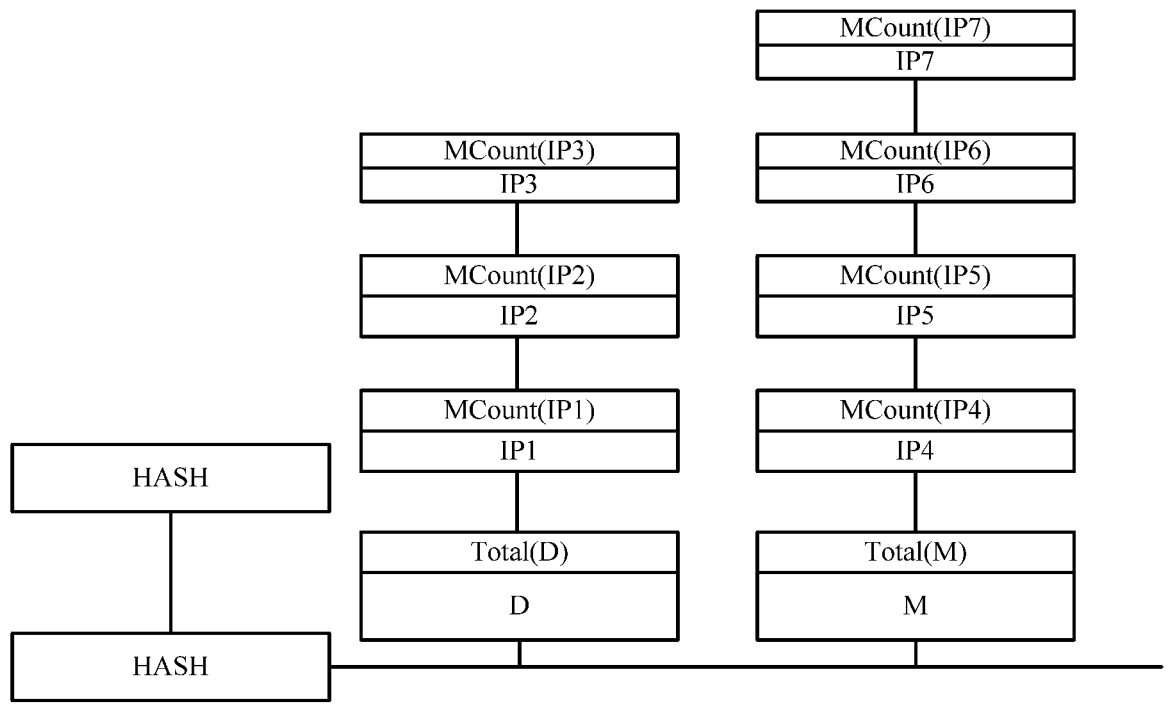
FIG. 5 is a schematic diagram of a monitoring entry according to an embodiment of the present disclosure.

FIG. 5 shows a schematic diagram of a monitoring entry created in the forgoing embodiment of the method for detecting an E-mail attack according to the present disclosure. In the FIG. 5, D represents a recipient E-mail address, and Total(D) represents the number of occurrences of the recipient E-mail address D in a detection period. A Hash node corresponding to D has altogether three slave nodes, which respectively store a sender IP address IP1 and the number of occurrences MCount(IP1) of the sender IP address IP1 in the detection period, a sender IP address IP2 and the number of occurrences MCount(IP2) of the sender IP address IP2 in the detection period, and a sender IP address IP3 and the number of occurrences MCount(IP3) of the sender IP address IP3 in the detection period. In the FIG. 5, M represents another recipient E-mail address, and Total (M) represents the number of occurrences of the recipient E-mail address M in the detection period. A Hash node corresponding to M has altogether four slave nodes, which respectively store a sender IP address IP4 and the number of occurrences MCount(IP4) of the sender IP address IP4 in the detection period, a sender IP address IP5 and the number of occurrences MCount(IP5) of the sender IP address IP5 in the detection period, a sender IP address IP6 and the number of occurrences MCount(IP6) of the sender IP address IP6 in the detection period, and a sender IP address IP7 and the number of occurrences MCount(IP7) of the sender IP address IP7 in the detection period.

Corresponding to the embodiments of the method for detecting an E-mail attack according to the present disclosure, embodiments of an apparatus and a device for detecting an E-mail attack are also provided in the present disclosure.

Figure 6:
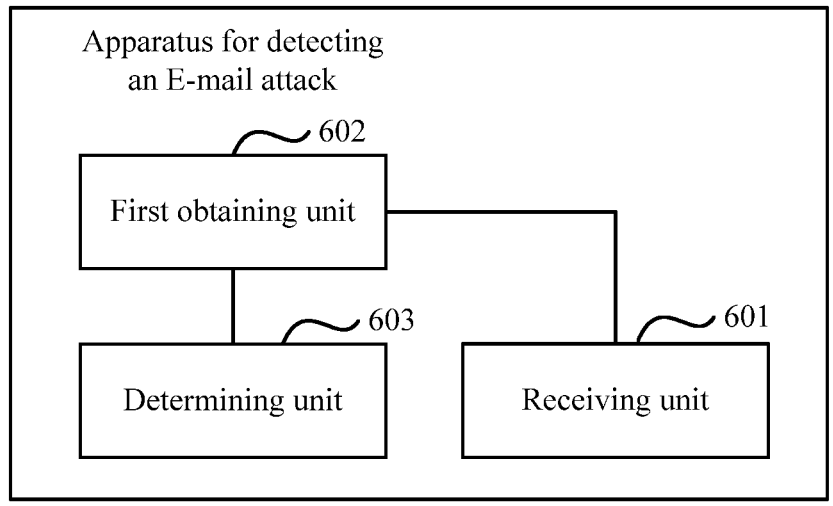
FIG. 6 is a schematic structural diagram of an apparatus for detecting an E-mail attack according to an embodiment of the present disclosure.

FIG. 6 shows an apparatus for detecting an E-mail attack according to an embodiment of the present disclosure. The apparatus includes a receiving unit 601, a first obtaining unit 602, and a determining unit 603.

The receiving unit 601 is configured to receive a data flow, the first obtaining unit 602 is configured to obtain an E-mail traffic parameter of each statistic period within a predetermined number of statistic periods, where within each statistic period, the E-mail traffic parameter of each of the statistic periods is determined according to a protocol type of the data flow received by the receiving unit 601, and the determining unit 603 is configured to determine, when the E-mail traffic parameter of each statistic period within the predetermined number of statistic periods matches a first threshold, that an E-mail attack is detected, where the E-mail traffic parameter is obtained by the first obtaining unit 602.

According to the apparatus for detecting an E-mail attack according to the embodiment of the present disclosure, the first obtaining unit 602 obtains the E-mail traffic parameter, and then the determining unit 603 determines, according to the E-mail traffic parameter obtained by the first obtaining unit 602, that an E-mail attack is detected, where the E-mail traffic parameter is determined by the first obtaining unit 602 according to the protocol type of the received data flow. As can be seen from the above, when the received data flow includes other data traffic in addition to E-mail traffic, the E-mail traffic included in the received data flow can be determined by the first obtaining unit 602 according to the protocol type of the data flow. Therefore, the E-mail traffic parameter can be determined accurately so that a detection result that the determining unit 603 detects an E-mail attack is more accurate.

Figure 7:
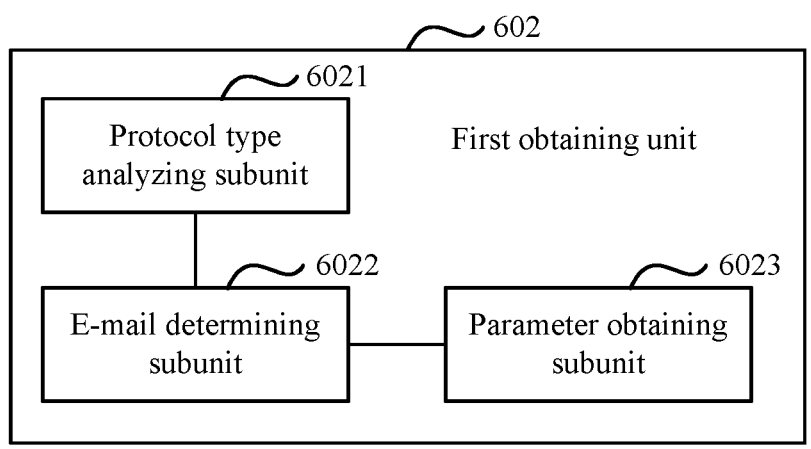
FIG. 7 is a schematic structural diagram of a first obtaining unit 601 according to an embodiment of the present disclosure.

FIG. 7 shows a specific embodiment of the first obtaining unit 602. The first obtaining unit 602 includes a protocol type analyzing subunit 6021, an E-mail determining subunit 6022, and a parameter obtaining subunit 6023.

The protocol type analyzing subunit 6021 is configured to analyze, within each statistic period, a protocol type of a data flow received in each of the statistic periods, the E-mail determining subunit 6022 is configured to determine that the data flow is an E-mail when the protocol type of the data flow, as analyzed by the protocol type analyzing subunit 6021, is an E-mail protocol type, and the parameter obtaining subunit 6023 is configured to obtain the E-mail traffic parameter of each of the statistic periods according to the E-mail determined by the E-mail determining subunit 6022.

In a specific embodiment of the forgoing apparatus for detecting an E-mail attack, the E-mail traffic parameter obtained by the first obtaining unit 602 includes the number of E-mails, or the number of newly created SMTP connections for transferring an E-mail, or the number of added SMTP concurrent connections for transferring an E-mail.

Figure 8:
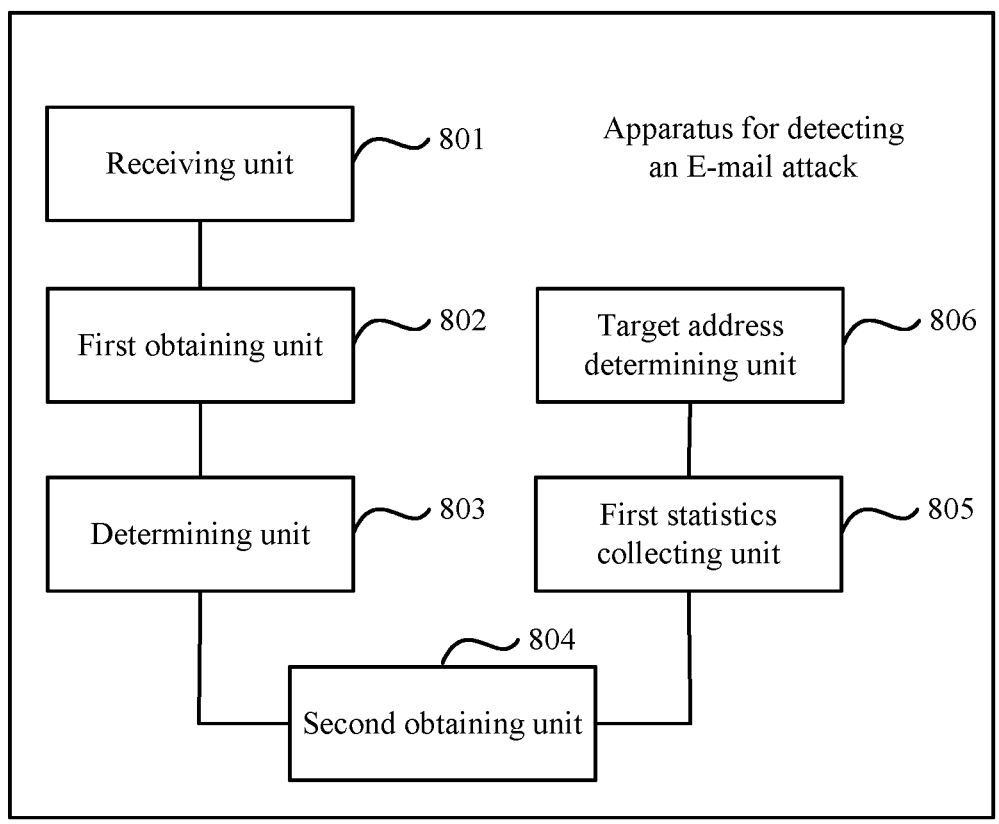
FIG. 8 is a schematic structural diagram of an apparatus for detecting an E-mail attack according to another embodiment of the present disclosure.

FIG. 8 shows an apparatus for detecting an E-mail attack according to another embodiment of the present disclosure. The apparatus includes a receiving unit 801, a first obtaining unit 802, a determining unit 803, a second obtaining unit 804, a first statistics collecting unit 805, and a target address determining unit 806.

The receiving unit 801 is configured to receive a data flow, the first obtaining unit 802 is configured to obtain an E-mail traffic parameter of each statistic period within a predetermined number of statistic periods, where within each statistic period, the E-mail traffic parameter of each of the statistic periods is determined according to a protocol type of the data flow received by the receiving unit 801, the determining unit 803 is configured to determine, when the E-mail traffic parameter of each statistic period within the predetermined number of statistic periods matches a first threshold, that an E-mail attack is detected, where the E-mail traffic parameter is obtained by the first obtaining unit 802, the second obtaining unit 804 is configured to: after the determining unit 803 determines that the E-mail attack is detected, obtain recipient E-mail addresses of E-mails received in each detection period within a predetermined number of detection periods, the first statistics collecting unit 805 is configured to collect statistics on the number of occurrences of each recipient E-mail address in each of the detection periods, where each recipient E-mail address is obtained by the second obtaining unit 804, and the target address determining unit 806 is configured to determine a recipient E-mail address, of which the number of occurrences, as determined by the first statistics collecting unit 805, in any detection period within the predetermined number of detection periods exceeds a second threshold, as a target address of the E-mail attack.

Figure 9:
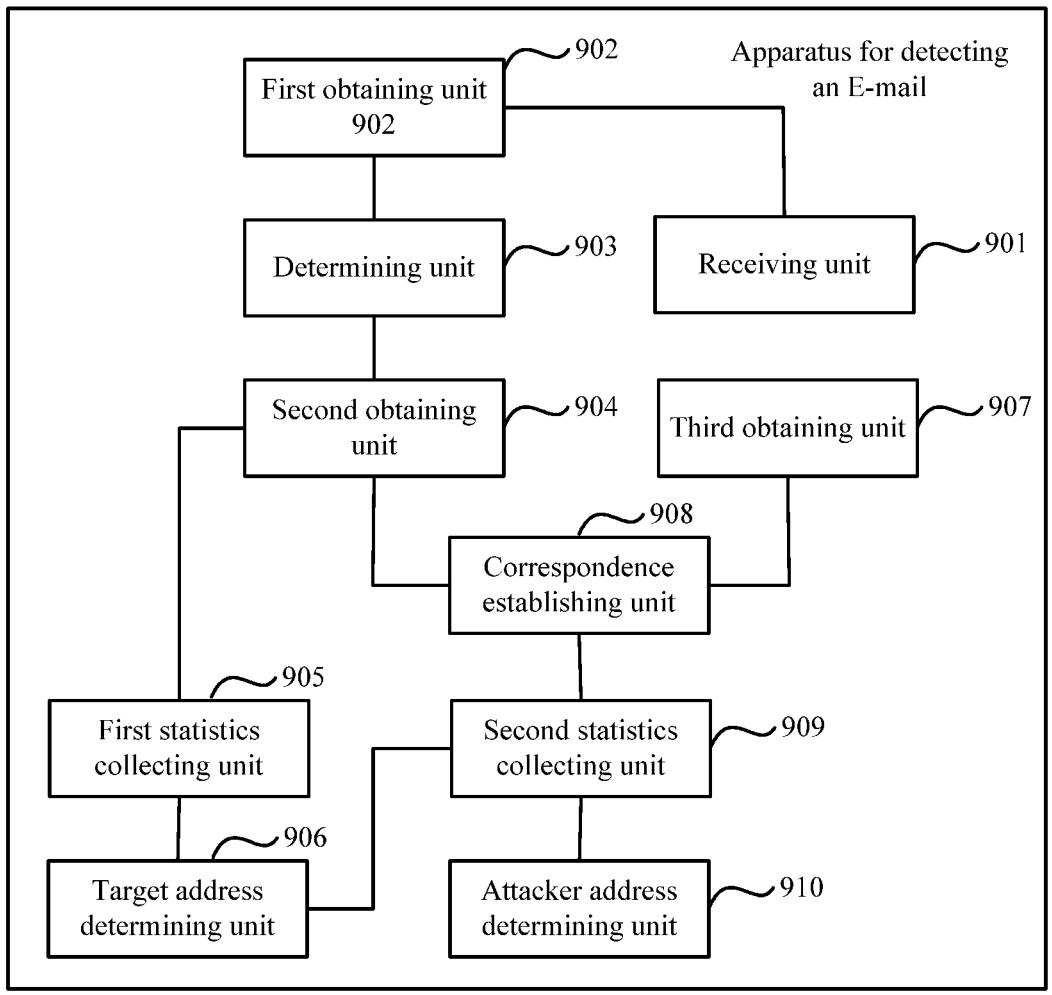
FIG. 9 is a schematic structural diagram of an apparatus for detecting an E-mail attack according to still another embodiment of the present disclosure.

FIG. 9 shows an apparatus for detecting an E-mail attack according to still another embodiment of the present disclosure. The apparatus includes a receiving unit 901, a first obtaining unit 902, a determining unit 903, a second obtaining unit 904, a first statistics collecting unit 905, a target address determining unit 906, a third obtaining unit 907, a correspondence establishing unit 908, a second statistics collecting unit 909, and an attacker address determining unit 910.

The receiving unit 901 is configured to receive a data flow, the first obtaining unit 902 is configured to obtain an E-mail traffic parameter of each statistic period within a predetermined number of statistic periods, where within each statistic period, the E-mail traffic parameter of each of the statistic periods is determined according to a protocol type of the data flow received by the receiving unit 901, the determining unit 903 is configured to determine, when the E-mail traffic parameter of each statistic period within the predetermined number of statistic periods matches a first threshold, that an E-mail attack is detected, where the E-mail traffic parameter is obtained by the first obtaining unit 902, the second obtaining unit 904 is configured to: after the determining unit 903 determines that the E-mail attack is detected, obtain recipient E-mail addresses of E-mails received in each detection period within a predetermined number of detection periods, the first statistics collecting unit 905 is configured to collect statistics on the number of occurrences of each recipient E-mail address in each of the detection periods, where each recipient E-mail address is obtained by the second obtaining unit 904, the target address determining unit 906 is configured to determine a recipient E-mail address, of which the number of occurrences, as determined by the first statistics collecting unit 905, in any detection period within the predetermined number of detection periods exceeds a second threshold, as a target address of the E-mail attack, the third obtaining unit 907 is configured to: at the same time when the second obtaining unit 904 obtains the recipient E-mail addresses of the E-mails received in each detection period within the predetermined number of detection periods, obtain sender IP addresses of the E-mails, the correspondence establishing unit 908 is configured to establish a correspondence, in each of the detection periods, between the recipient E-mail addresses of the E-mails received obtained by the second obtaining unit 904 and the sender IP addresses obtained by the third obtaining unit 907, the second statistics collecting unit 909 is configured to: after the target address determining unit 906 determines the target address, collect statistics, according to the correspondence established by the correspondence establishing unit 908, on the number of occurrences of each sender IP address corresponding to the target address, and the attacker address determining unit 910 is configured to determine a sender IP address, of which the number of occurrences determined by the second statistics collecting unit 909 exceeds a third threshold, as an attacker IP address of the E-mail attack.

Figure 10:
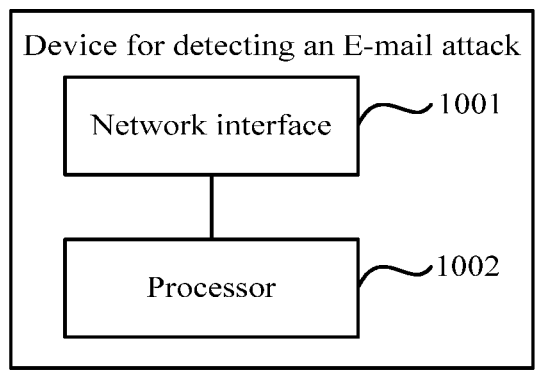
FIG. 10 is a schematic structural diagram of a device for detecting an E-mail attack according to an embodiment of the present disclosure.

FIG. 10 shows a device for detecting an E-mail attack according to an embodiment of the present disclosure. The device includes a network interface 1001 and a processor 1002.

The network interface 1001 is configured to receive a data flow.

The processor is configured to: obtain an E-mail traffic parameter of each statistic period within a predetermined number of statistic periods, where within each statistic period, the E-mail traffic parameter of each of the statistic periods is determined according to a protocol type of the data flow received by the network interface 1001, and determine, when the E-mail traffic parameter of each statistic period within the predetermined number of statistic periods matches a first threshold, that an E-mail attack is detected.

In one specific embodiment of the device for detecting an E-mail attack according to the present disclosure, the processor 1002 may be configured to: analyze, within each statistic period, a protocol type of a data flow received by the network interface 1001 in each of the statistic periods, determine that the data flow is an E-mail when the protocol type of the data flow is an E-mail protocol type, and obtain the E-mail traffic parameter of each of the statistic periods according to the determined E-mail.

In another specific embodiment of the device for detecting an E-mail attack according to the present disclosure, the E-mail traffic parameter obtained by the processor 1002 includes the number of E-mails, or the number of newly created SMTP connections for transferring an E-mail, or the number of added SMTP concurrent connections for transferring an E-mail.

In still another specific embodiment of the device for detecting an E-mail attack according to the present disclosure, the processor 1002 may further be configured to: after the determining that an E-mail attack is detected, obtain recipient E-mail addresses of E-mails received by the network interface 1001 in each detection period within a predetermined number of detection periods, collect statistics on the number of occurrences of each obtained recipient E-mail address in each of the detection periods, and determine a recipient E-mail address, of which the number of occurrences in any detection period within the predetermined number of detection periods exceeds a second threshold, as a target address of the E-mail attack.

In still another specific embodiment of the device for detecting an E-mail attack according to the present disclosure, the processor 1002 may further be configured to: at the same time of the obtaining recipient E-mail addresses of E-mails received by the network interface 1001 in each detection period within a predetermined number of detection periods, obtain sender IP addresses of the E-mails, establish a correspondence between the recipient E-mail addresses and the sender IP addresses of the E-mails received in each of the detection periods, after the determining a recipient E-mail address, of which the number of occurrences in any detection period within the predetermined number of detection periods exceeds a second threshold, as a target address of the E-mail attack, collect statistics, according to the correspondence, on the number of occurrences of each sender IP address corresponding to the target address, and determine a sender IP address, of which the number of occurrences exceeds a third threshold, as an attacker IP address of the E-mail attack.

It should be noted that, the apparatus for detecting an E-mail attack shown in FIG. 6 may be integrated into the device for detecting an E-mail attack illustrated in this embodiment.

In a practical application, the device for detecting an E-mail attack in the embodiment of the present disclosure may be an E-mail server or a gateway device.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by the hardware or the software depends on specific applications and design constraint conditions of the technical solutions. For the specific applications, a person skilled in the art may use different methods to achieve the described functions, but it should not be considered that the implementation goes beyond the scope of the embodiments of the present disclosure.

Steps of methods or algorithms described with reference to the embodiments disclosed in this specification may be implemented directly by hardware, a software module executed by a processor, or a combination thereof.

The embodiments disclosed above are described to enable a person skilled in the art to implement or use the embodiments of the present disclosure. Various modifications to these embodiments will be obvious to a person skilled in the art, and the general principles defined in this specification may also be implemented in other embodiments without departing from the spirit or scope of the embodiments of the present disclosure. Accordingly, embodiments of the present disclosure are not intended to be limited to these embodiment illustrated in this specification, but shall be construed in the widest scope consistent with the principles and novel features disclosed in this specification.

What is described above is only exemplary embodiments of the present disclosure, but is not intended to limit embodiments of the present disclosure, and any modifications, equivalent replacements, improvements and so on that are made within the spirit and principles of the embodiments of the present disclosure shall all be covered within the scope of the embodiments of the present disclosure.

What is claimed is:

1. A method implemented by a network device for detecting an electronic mail (E-mail) attack, the method comprises:
    receiving data flows that flow through the network device during at least two statistic periods;
    obtaining an E-mail traffic parameter of each of the statistic periods based on a protocol type of a data flow that is received in each of the statistic periods;
    determining that the E-mail attack is detected in response to determining that the E-mail traffic parameter of each of the statistic periods matches a first threshold;
    obtaining a plurality of recipient E-mail addresses of E-mails received during the E-mail attack in each of the statistic periods after the E-mail attack is detected;
    collecting statistics on a number of occurrences of each of the recipient E-mail addresses in each of the statistic periods;
    selecting a first recipient E-mail address in the recipient E-mail addresses as a target address of the E-mail attack, when the number of occurrences of the first recipient E-mail address in each of the statistic periods exceeds a second threshold; and
    limiting traffic for the target address of the E-mail attack.

2. The method according to claim 1, wherein obtaining the E-mail traffic parameter of each of the statistic periods based on the protocol type of the data flow comprises:
    analyzing the protocol type of the data flow received in each of the statistic periods;
    determining that the data flow is an E-mail in response to the protocol type being an E-mail protocol type; and
    obtaining the E-mail traffic parameter of each of the statistic periods based on determining that the data flow is an E-mail.

3. The method according to claim 2, further comprising:
    obtaining sender Internet Protocol (IP) addresses of the E-mails at a same time of the obtaining recipient E-mail addresses of E-mails received in each of the statistic periods;
    establishing a monitor entry to record a correspondence between the recipient E-mail addresses and the sender IP addresses of the E-mails received during each of the statistic periods, wherein a first hash node of the monitor entry stores the number of occurrences of a first recipient E-mail address in a first statistic period, and wherein a first slave node of the first hash node stores the number of occurrences of a first sender IP address which appears together with the first recipient E-mail address in the E-mail received in the first statistic period;
    collecting, based on the correspondence between the recipient E-mail addresses and the sender IP addresses of the E-mails received during each of the statistic periods, statistics on the number of occurrences of each sender IP address corresponding to the target address; and
    determining a first sender IP address of which the number of occurrences exceeds a third threshold as an attacker IP address of the E-mail attack.

4. The method according to claim 1, further comprising:
    obtaining sender Internet Protocol (IP) addresses of the E-mails at a same time as the obtaining recipient E-mail addresses of E-mails received in each of the statistic periods;
    establishing a monitor entry to record a correspondence between the recipient E-mail addresses and the sender IP addresses of the E-mails received for each of the statistic periods, wherein a first hash node of the monitor entry stores the number of occurrences of a first recipient E-mail address in a first statistic period, and wherein a first slave node of the first hash node stores the number of occurrences of a first sender IP address which appears together with the first recipient E-mail address in the E-mail received in the first statistic period;
    collecting, based on the correspondence between the recipient E-mail addresses and the sender IP addresses of the E-mails received for each of the statistic periods, statistics on the number of occurrences of each of the sender IP addresses corresponding to the target address; and determining a first sender IP address of which the number of occurrences exceeds a third threshold as an attacker IP address of the E-mail attack.

5. The method according to claim 1, wherein the E-mail traffic parameter comprises a number of E-mails.

6. The method according to claim 1, wherein the E-mail traffic parameter comprises a number of newly created simple mail transfer protocol (SMTP) connections for transferring an E-mail.

7. The method according to claim 1, wherein the E-mail traffic parameter comprises a number of added simple mail transfer protocol (SMTP) concurrent connections for transferring an E-mail.

8. A device for detecting an electronic mail (E-mail) attack, comprising:
a network interface configured to receive data flows that flow through a network device during at least two statistic periods; and
a hardware processor coupled to the network interface and configured to:
obtain an E-mail traffic parameter of each of the statistic periods based on a protocol type of a data flow that is received in each of the statistic periods;
determine that the E-mail attack is detected in response to the E-mail traffic parameter of each of the statistic periods matching a first threshold;
obtain a plurality of recipient E-mail addresses of E-mails received during the E-mail attack in each of the statistic periods after the E-mail attack is detected;
collect statistics on a number of occurrences of each of the recipient E-mail addresses in each of the statistic periods;
select a first recipient E-mail address in the recipient E-mail addresses=as a target address of the E-mail attack, when the number of occurrences of the first recipient E-mail address in any statistic period exceeds a second threshold; and
limit traffic for the target address of the E-mail attack.

9. The device according to claim 8, wherein the hardware processor is further configured to:
analyze the protocol type of the data flow received by the network interface within each of the statistic periods;
determine that the data flow is an E-mail in response to the protocol type of the data flow being an E-mail protocol type; and
obtain the E-mail traffic parameter of each of the statistic periods based on determining that the data flow is E-mail.

10. The device according to claim 9, wherein the hardware processor is further configured to:
obtain sender Internet Protocol (IP) addresses of the E-mails at a same time as the obtaining recipient E-mail addresses of E-mails received by the network interface in each of the statistic periods;
establish a monitor entry to record a correspondence between the recipient E-mail addresses and the sender IP addresses of the E-mails received for each of the statistic periods, wherein a first hash node of the monitor entry stores the number of occurrences of a first recipient E-mail address in a first statistic period, and wherein a first slave node of the first hash node stores the number of occurrences of a first sender IP address which appears together with the first recipient E-mail address in the E-mail received in the first statistic period;
collect, based on the correspondence between the recipient E-mail addresses and the sender IP addresses of the E-mails received during each of the statistic periods, statistics on the number of occurrences of each sender IP address corresponding to the target address; and
determine a first sender IP address of which the number of occurrences exceeds a third threshold as an attacker IP address of the E-mail attack.

11. The device according to claim 8, wherein the hardware processor is further configured to:
obtain sender Internet Protocol (IP) addresses of the E-mails at a same time as the obtaining recipient E-mail addresses of E-mails received by the network interface in each of the statistic periods;
establish a monitor entry to record a correspondence between the recipient E-mail addresses and the sender IP addresses of the E-mails received for each of the statistic periods, wherein a first hash node of the monitor entry stores the number of occurrences of a first recipient E-mail address in a first statistic period, and wherein a first slave node of the first hash node stores the number of occurrences of a first sender IP address which appears together with the first recipient E-mail address in the E-mail received in the first statistic period;
collect, based on the correspondence between the recipient E-mail addresses and the sender IP addresses of the E-mails received for each of the statistic periods, statistics on the number of occurrences of each of the sender IP addresses corresponding to the target address; and
determine a first sender IP address, of which the number of occurrences exceeds a third threshold as an attacker IP address of the E-mail attack.

12. The device according to claim 8, wherein the E-mail traffic parameter comprises a number of E-mails.

13. The device according to claim 8, wherein the E-mail traffic parameter comprises a number of newly created simple mail transfer protocol (SMTP) connections for transferring an E-mail.

14. The device according to claim 8, wherein the E-mail traffic parameter comprises a number of added simple mail transfer protocol (SMTP) concurrent connections for transferring an E-mail.

* * * * *

UNITED STATES PATENT AND TRADEMARK OFFICE
CERTIFICATE OF CORRECTION

PATENT NO. : 10,673,874 B2  
APPLICATION NO. : 16/156514  
DATED : June 2, 2020  
INVENTOR(S) : Wu Jiang and Xingshui Dong Page 1 of 1

It is certified that error appears in the above-identified patent and that said Letters Patent is hereby corrected as shown below:

In the Claims

Claim 8, Column 17, Line 37: "addresses=as a" should read "addresses, as a"

Signed and Sealed this
Twenty-first Day of July, 2020

Andrei Iancu
*Director of the United States Patent and Trademark Office*